(12) United States Patent
Cherian et al.

(10) Patent No.: US 9,003,118 B2
(45) Date of Patent: Apr. 7, 2015

(54) SYSTEMS AND METHODS FOR NON-VOLATILE CACHE CONTROL

(75) Inventors: Jacob Cherian, Austin, TX (US); Marcelo Saraiva, Austin, TX (US); Shane Chiasson, Pflugerville, TX (US); Gary Kotzur, Austin, TX (US); Douglas Huang, Pflugerville, TX (US); Anand Nunna, Round Rock, TX (US); William Lynn, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 817 days.

(21) Appl. No.: 12/351,231

(22) Filed: Jan. 9, 2009

(65) Prior Publication Data

US 2010/0180065 A1      Jul. 15, 2010

(51) Int. Cl.
*G06F 12/00* (2006.01)
*G06F 12/08* (2006.01)

(52) U.S. Cl.
CPC ........ *G06F 12/0804* (2013.01); *G06F 12/0868* (2013.01); *G06F 2212/222* (2013.01)

(58) Field of Classification Search
None
See application file for complete search history.

(56) References Cited

U.S. PATENT DOCUMENTS

| 5,701,516 | A | * | 12/1997 | Cheng et al. | ..................... 710/22 |
| 5,777,923 | A | * | 7/1998 | Lee et al. | ................. 365/185.11 |
| 2006/0015683 | A1 | * | 1/2006 | Ashmore et al. | ............. 711/113 |
| 2007/0226418 | A1 | * | 9/2007 | Mizuno et al. | ................ 711/118 |

OTHER PUBLICATIONS http://en.wikipedia.org/wiki/Field-programmable_gate_array as archived by www.archive.org on Dec. 18, 2008.*

* cited by examiner

*Primary Examiner* — Matthew Bradley
*Assistant Examiner* — Daniel Tsui
(74) *Attorney, Agent, or Firm* — Baker Botts L.L.P.

(57) ABSTRACT

In some embodiments, a method for controlling a cache having a volatile memory and a non-volatile memory during a power up sequence is provided. The method includes receiving, at a controller configured to control the cache and a storage device associated with the cache, a signal indicating whether the non-volatile memory includes dirty data copied from the volatile memory to the non-volatile memory during a power down sequence, the dirty data including data that has not been stored in the storage device. In response to the received signal, the dirty data is restored from the non-volatile memory to the volatile memory, and flushed from the volatile memory to the storage device.

18 Claims, 4 Drawing Sheets

SYSTEMS AND METHODS FOR NON-VOLATILE CACHE CONTROL

TECHNICAL FIELD

The present disclosure relates to memory, and more particularly, system and methods for controlling non-volatile cache.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as, but not limited to, financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use an array of storage device, such as a Redundant Array of Independent Disks (RAID), for example, for storing information. Arrays of storage devices typically utilize multiple disks to perform input and output operations and can be structured to provide redundancy which may increase fault tolerance. Implementations of storage device arrays may employ a number of techniques to provide for redundancy, including striping, mirroring, and/or parity checking. For example, as known in the art, RAIDs may be implemented according to numerous RAID standards, including without limitation, RAID 0, RAID 1, RAID 0+1, RAID 3, RAID 4, RAID 5, RAID 6, RAID 01, RAID 03, RAID 10, RAID 30, RAID 50, RAID 51, RAID 53, RAID 60, RAID 100, etc.

There are several techniques for writing data to the storage device using a controller (e.g., a RAID controller), operating in two different write modes. The controller may control transfer of data to the storage device arrays and/or write caches. For example, in a write-through mode, data or program instruction sent from a sender (e.g., processor, host, etc.) are received at the controller and the controller may pass the information directly to the intended storage device. The storage device may store the received data and may send an acknowledgment back to the controller, which forwards the acknowledgment to the sender. While the handshaking between the intended storage device and sender guarantees the integrity of the transfers, the write-through process often adds latency to the process.

In a write back mode, the controller assumes ownership of receive data and/or program instructions received from a sender. Rather than immediately storing the data onto a storage device arrays (e.g., hard disk drives), for example, the controller may store the data in a write cache and signal to the host operating system that the data has been successfully stored. This significantly speeds up the acknowledgment back to the host operating system that the data has been successfully stored. Then, when it is convenient, the data in the write cache is flushed to the storage device, where it becomes "permanently" stored.

However, until the write cache data is actually stored on the storage device, it remains "dirty." The term "dirty" indicates that write cache data has yet to be written to a storage device. Since cache memories are often volatile memories that need electric power in order to store data, this data is vulnerable to being permanently lost if there is a power outage or other power event (e.g., sleep mode and/or standby).

Current systems use a battery-backed storage device that provide power upon power loss to the components information handling system, including, for example, the RAID systems. There are several problems with using battery back storage devices including reliability, shelf-life, and the need for faster I/O speed which is often hampered with the use of batteries.

SUMMARY

In accordance with certain embodiment of the present disclosure, a method for controlling a cache having a volatile memory and a non-volatile memory during a power up sequence is provided. The method includes receiving, at a controller configured to control the cache and a storage device associated with the cache, a signal indicating whether the non-volatile memory includes dirty data copied from the volatile memory to the non-volatile memory during a power down sequence, the dirty data including data that has not been stored in the storage device. In response to the received signal, the dirty data is restored from the non-volatile memory to the volatile memory, and flushed from the volatile memory to the storage device.

In certain embodiments, a method for controlling a cache having a volatile memory and a non-volatile memory includes detecting a power loss to the cache; in response to the detection of power loss, automatically enabling a backup power supply associated with the cache, writing dirty data from the volatile memory to the non-volatile memory (the dirty data including data that has not been stored in the storage device; and upon restoration of power to the cache, communicating a signal to a controller associated with the cache, the signal indicating presence of the dirty data in the non-volatile memory.

In certain embodiments, an information handling system may include a processor; a cache coupled to the processor, the cache including a volatile memory and a non-volatile memory; a storage device; and a controller associated with the cache and storage device. The controller is configured to receive a signal indicating whether the non-volatile memory includes dirty data (e.g., data that has not been stored in the storage device) and in response to the received signal, (a) restore the dirty data from the non-volatile memory to the volatile memory, and (b) flush the dirty data from the volatile memory to the storage device.

In certain embodiments, an information handling system may include a processor; a cache coupled to the processor, that cache including a volatile memory and a non-volatile memory; a power supply unit coupled to the cache; and a storage device. The cache may be configured to detect a power loss to the cache; enable the power supply unit; write dirty data from the volatile memory to the non-volatile memory (the dirty data including data that has not been stored in the storage device); and upon restoration of power to the cache, communicate a signal to a controller associated with the cache indicating presence of the dirty data in the non-volatile memory.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-6, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and/or a video display. The information handling system may also include one or more buses operable to transmit communications between the various hardware components.

Figure 1:
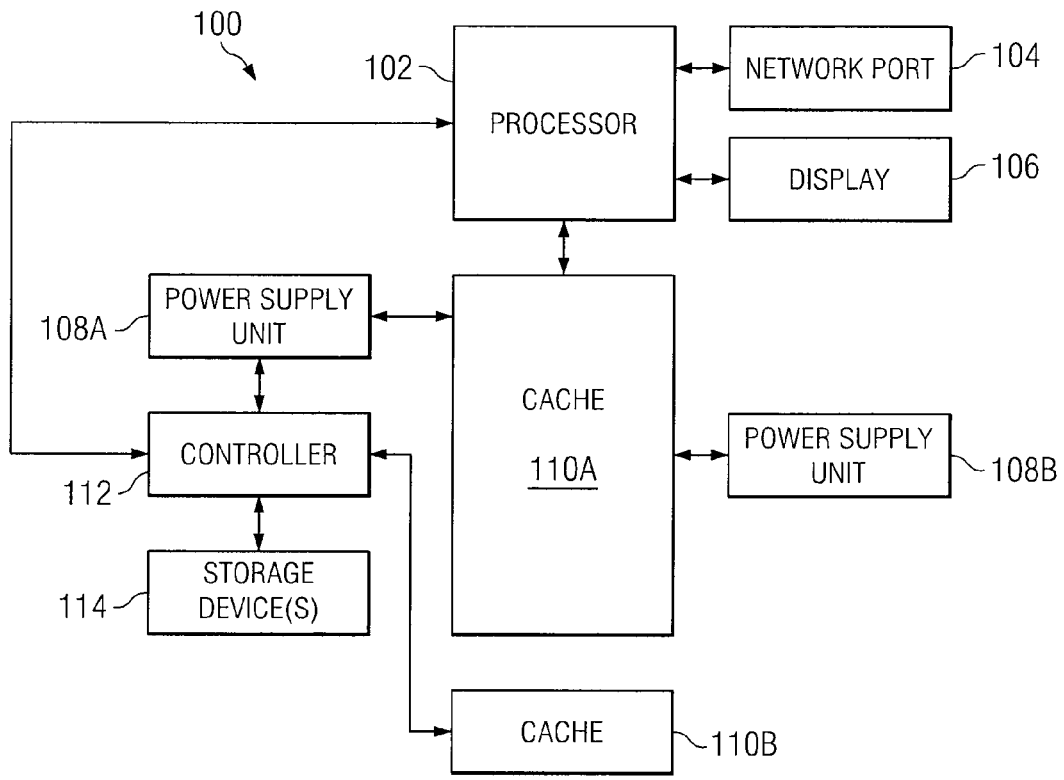
FIG. 1 illustrates a block diagram of an example information handling system including a controller configured to control a cache of the information handling system, in accordance with certain embodiments of the present disclosure.

FIG. 1 illustrates a block diagram of an example information handling system 100 including a controller configured to control the storage device(s) of the information handling system 100, in accordance with certain embodiments of the present disclosure. As shown in FIG. 1, information handling system 100 may include a processor 102, a network port 104, a display 106, power supply units 108A and 108B, cache 110A and 110B, a controller 112, and one or more storage devices 114.

Processor 102 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 104, cache(s) 110, and/or another component of information handling system 100 and may output results, graphical user interfaces (GUIs), websites, and the like via display 106 or over network port 104.

Network port 104 may be any suitable system, apparatus, or device operable to serve as an interface between information handling system 100 and a network. Network port 104 may enable information handling system 100 to communicate over a network using any suitable transmission protocol and/or standard, including without limitation all transmission protocols and/or standards known in the art.

Display 106 may comprise any display device suitable for creating graphic images and/or alphanumeric characters recognizable to a user, and may include, for example, a liquid crystal display (LCD) or a cathode ray tube (CRT).

Power supply unit 108A may include any system, device, and/or apparatus operable to supply AC, DC, or a combination of AC and DC electrical power directly to one or more components of information handling system 100, including, for example, processor 102, network port 104, display 106, cache(s) 110, controller 112, and/or storage device(s) 114.

In some embodiments, power supply unit 108A may include an uninterruptible power supply unit or a switch mode power supply unit. Alternatively, power supply unit 108A may include an array of power supply units, e.g., an array of programmable DC power sources.

Power supply unit 108B may include any system, device, and/or apparatus operable to supply AC, DC, or a combination of AC and DC electrical power directly to cache(s) 110 when power supply 108A is interrupted or fails, thereby preserving the integrity of the data stored in various components of cache(s) 110 up until at least a complete discharge or power failure of power supply unit 108B. Power supply unit 108B may be a capacitor, super capacitor, battery, or other suitable power supply or supplies configured to permanently or temporarily supply power to cache 110 in the event of a power failure or interruption. The use of power supply unit 108B for cache 110 may preserve data stored in storage mediums, such as volatile memory that generally lose data when a power event occurs.

Caches 110 may be coupled to one or more components of information handling system 100. For example, cache 110A may be coupled to processor 102 and cache 110B may be coupled to controller 112. Caches 110 may comprise any system, device, or apparatus operable to retain program instructions or data for a period of time. Caches 110 may include random access memory (RAM), electrically erasable programmable read-only memory (EEPROM), a PCMCIA card, flash memory, or any suitable selection and/or array of volatile and/or non-volatile memory configured to retain data after power to information handling system 100 is turned off. Various features of cache 110 are described below in more detail with respect to FIG. 2.

Controller 112 may be communicatively coupled to processor 102, cache(s) 110, and/or storage device(s) 114 and may include any hardware, software, and/or firmware configured to control cache 110 and storage device(s) 114 and the data transfer to and from cache 110 and storage device(s) 114. In the same or alternative embodiments, controller 112 may be configured to control data transfer between components of cache 110.

In operation, controller 112 may be configured to send and receive signals to and from cache(s) 110. In the event of a power interruption (e.g., power failure) and/or when information handling system 100 experiences power interruptions, controller 112 may provide signals to recover any data stored in, for example, a volatile memory 202 of cache(s) 110 and/or a non-volatile memory 204 of cache(s) 110 at or during the time of the power failure. The communicative interactions between the controller 110 and the components of cache(s) 110, including volatile memory 202 and non-volatile memory 204, is described below in more detail with respect to FIG. 2.

One or more storage device 114 coupled to controller 112 may be any system, device, or apparatus operable to retain program instructions or data for a period of time. Storage device(s) 114 may include any combination of hard disk drives, magnetic tape libraries, optical disk drives, magneto-optical disk drives, compact disk drives, compact disk arrays, disk array controllers, and/or any computer-readable medium operable to store data. In certain embodiments, storage devices(s) 114 may include or be an integral part of an array of storage devices (e.g., a RAID).

Figure 2:
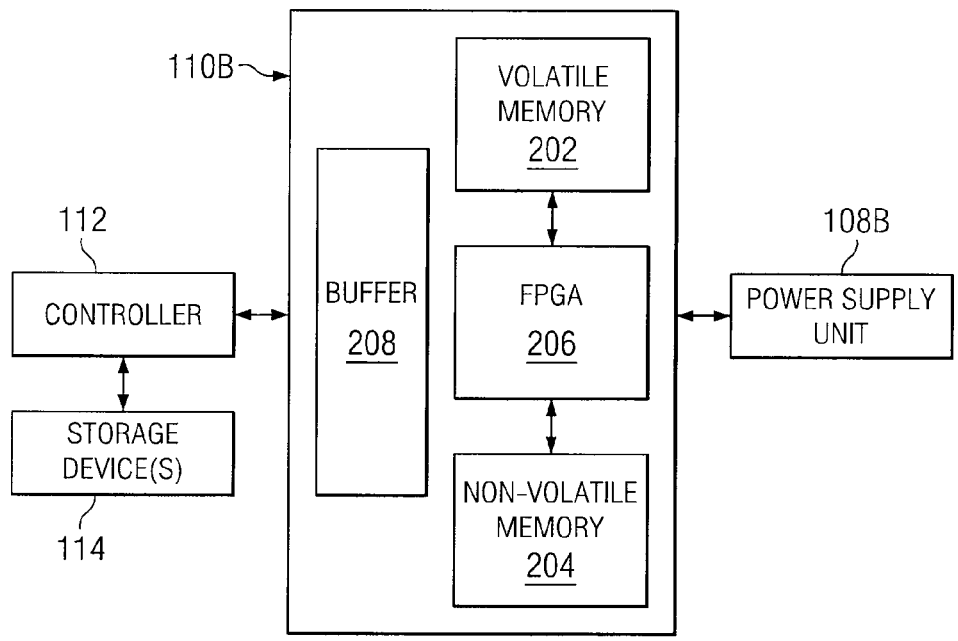
FIG. 2 illustrates a block diagram of the controller and the cache of the information handling system depicted in FIG. 1, in accordance with certain embodiments of the present disclosure.

FIG. 2 illustrates an example block diagram of controller 112 and caches(s) 110 of the information handling system 100 depicted in FIG. 1, in accordance with certain embodiments of the present disclosure. Cache 110 may be configured in a RAID array and may include, for example, a volatile memory 202, a non-volatile memory 204, a field programmable gate array (FPGA) 206, and a buffer 208.

Volatile memory 202 may be a cache configured to store a collection of data that is quickly accessible to, for example, processor 102. The data may be temporarily stored in volatile memory 202 and may subsequently be transferred to another storage medium (e.g., flushed to a permanent storage medium such as storage device(s) 114 of FIG. 1).

In one embodiment, volatile memory 202 may include random access memory (e.g., DRAM array, SRAM array) and/or other storage devices that may require power to maintain stored data.

Non-volatile memory 204 may be coupled to volatile memory 202 may be configured to retain data stored on the device even when the device is not powered. In some embodiments, data stored in volatile memory 202 may be transferred to non-volatile memory 204 upon detection of a power failure or other power events of information handling system 100.

Non-volatile memory 204 may include any combination of flash device(s), read-only memories, magnetic computer device(s), optical disc drive(s), and/or other storage devices that do not require a power supply to maintain the stored data.

FPGA 206 may be coupled to volatile memory 202, non-volatile storage 204, and buffer 208 and may be configured to monitor power supplied to information handling system 100, and in particular, power supplied to cache 110. In the event of a power failure, FPGA 206 may be configured to "control" the transfer of data from volatile memory 202 to non-volatile memory 204.

In the same or alternative embodiments, FPGA 206 may be configured to receive, via buffer 208, control signals from controller 112. The control signals to controller 112 from cache 110 may include, for example, the state of cache 110 (e.g., state of memory 202 and/or 204), the state of the power supplied to information handling system 100 via power supply unit 108A, and/or the state of the power supplied to cache 110 via power supply unit 108B.

Depending on the various states of the cache 110 and/or a power event (e.g., power failure), controller 112 may send control signals and/or request signals from cache 110. For example, controller 112 may send a signal indicating which write mode (e.g., write through or write back) the controller is using. Based at least on the sent and received signals, controller 112 and/or cache 110 may initiate data transfers (a) from processor 102 to cache 110 and/or (b) between storage mediums (e.g., between volatile memory 202 and non-volatile memory 204) of cache 110. Examples of the control signals and data transfers are shown with respect to FIGS. 3-6 below.

Figure 3:
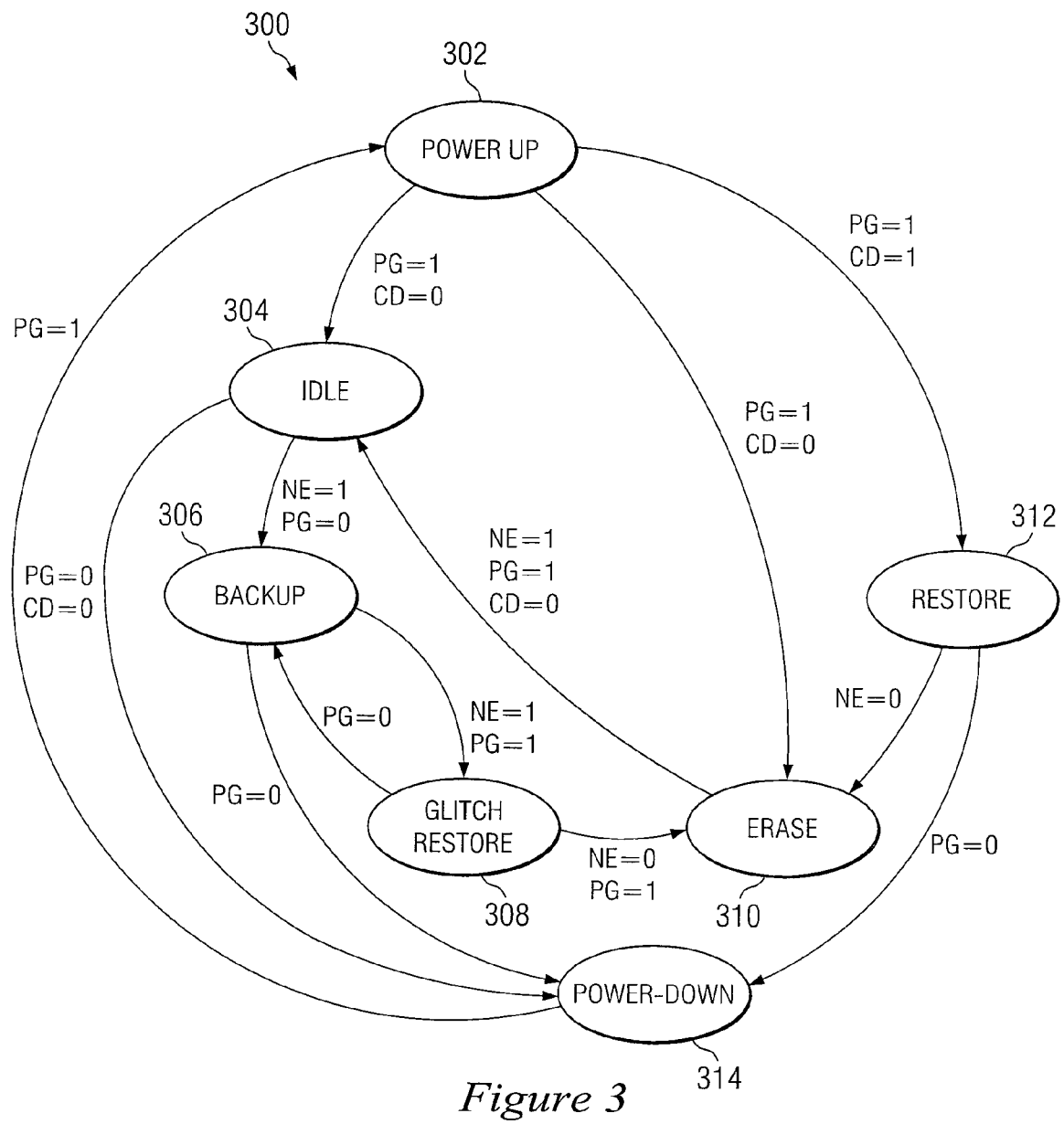
FIG. 3 illustrates an example state diagram showing transition states of information handling system depicted in FIG. 1, in accordance with certain embodiments of the present disclosure.

FIG. 3 illustrates an example state diagram showing transition states of information handling system 100 depicted in FIG. 1, in accordance with certain embodiments of the present disclosure. Information handling system may include a power up state 302, an idle state 304, a backup state 306, a glitch restore state 308, an erase state 310, a restore state 312, a power down state 314, and/or any other suitable operationally states. At power up state 302, power may be supplied to information handling system 100 by power supply unit 108. Power up state 302 may occur after a proper system shutdown automatically initiated by information handling system 100 and/or manually initiated by a user. In some instances, power up state 302 may occur after power is restored to information handling system 100 after a power interruption, failure, etc.

Idle state 304 represents the normal operation state of information handling system. For example, during idle state 304, information handling system may handle normal routines including, for example, processing data and instructions, accessing information stored in cache(s) 110, storage device 114, etc.

Backup state 306 occurs when power supplied by power supply unit 108 to component(s) of information handling system 100 is interrupted or has failed. In this state, any "dirty" data (e.g., valid data that has not yet been flushed to storage device 114) stored in volatile memory 202 may be "backed up" or written to non-volatile memory 204.

Glitch restore state 308 occurs when power is restored during backup state 306. During glitch restore state 308, controller 112 and/or cache 110 may pause the process of writing data from volatile memory 202 to non-volatile memory 204 and any dirty data in volatile memory 202 may be flushed to storage device(s) 114.

Erase state 310 generally occurs after a power up state or power restore state (e.g., power up state 302, glitch restore state 308, or restore state 312). During erase state 310, any data (e.g., dirty and/or non-dirty data) currently being stored in non-volatile memory 204 may be erased so that another write command may occur at non-volatile memory 204 at idle state 304.

Restore state 312 may occur after power up state 302 where non-volatile memory 204 may be storing dirty (e.g., valid data) that needs to be permanently stored in storage device(s) 114. In one embodiment, during restore state 312, dirty data stored in non-volatile memory 204 may be written to volatile memory 202 and subsequently flushed to storage device(s) 114.

Power down state 314 may occur when information handling system 100 is automatically powered down or manually powered down by a user. In other embodiments, power down state 312 may occur when a power failure and/or interruption occurs in information handling system 100.

In operation, various state or transition conditions (e.g., a signal, a flag, and/or any other indicators) may determine the flow between the various states of state diagram 300. In one embodiment, the transition conditions may include a valid power or when power is sufficient (PG=1) condition, a cache dirty (CD=1) condition, and a non-volatile memory enable (NE=1) condition, although other transition conditions may also be used to control the transitions between states 302-314.

After information handling system 100 is powered on (power on state 302), if PG=1 (e.g., indicating power supplied by power supply unit 108A is sufficient), if CD=0 (e.g., indicating that no dirty data is stored in cache(s) 110), handling system 100 transitions from power up state 302 to idle state 304, where information handling system 100 operates normally (e.g., processing data and/or instructions). In some embodiments, information handling system may also determine if non-volatile memory 204 has been erased by detecting a flag or other indicators that reflect the state of non-volatile memory 204. If non-volatile memory 204 has been erased, information handling system 100 may transition from power up state 302 to idle state 304. Details of the transition between states 302 and 304 are discussed below with respect to FIG. 4 (e.g., steps 402, 404, 406, 416, and 414).

Otherwise, if the PG=1 and CD=0 (e.g., indicating that no dirty data is stored in cache(s) 110), information handling system 100 transitions from power up state 302 to erase state 310 for initialization (e.g., erasing any data stored on non-volatile memory 204) of non-volatile memory 204 before information handling system 100 may write data to non-volatile memory 204 (idle state 304) (e.g., processing data and/or instructions). In some embodiments, information handling system may also determine if non-volatile memory 204 has been erased by detecting a flag or other indicators that reflect the state of non-volatile memory 204. If non-volatile memory 204 has not been erased, information handling system 100 may transition from power up state 302 to erase state 304. Details of the transition between states 302 and 304 are discussed below with respect to FIG. 4 (e.g., steps 402, 404, 406, 416, and 414).

Details of the transition between states 302, 310, and 304 are discussed below with respect to FIG. 4 (e.g., steps 402, 404, 406, 416, 412, and 414).

In some embodiments, if PG=1 and CD=1 (e.g., indicating dirty data stored in cache(s) 110), information handling system 100 may transition from power up state 302 to restore state 312, where dirty data present in cache(s) 110 may be flushed to storage device(s) 114. In some respects, dirty data stored in non-volatile memory 204 may be from a previous back-up when information handling system 100 lost power (e.g., state 306 and PG=0) where dirty data in volatile memory 202 was written to non-volatile memory 204. After the data is restored to volatile memory 202, the dirty data may subsequently be flushed to storage device(s) 114. Details of restoring of data from non-volatile memory to volatile memory 202 are discussed below with respect to FIG. 4 (e.g., steps 402, 404, 406, 408).

After the dirty data is flushed to storage device 114, NE=0 (e.g., indicating dirty and/or non-dirty data is stored in non-volatile memory 204), and information handling system 100 may transition from restore state 312 to erase state 310, where data stored on non-volatile memory 204 may be erased and non-volatile memory 204 is initialized before information handling system 100 may write data to non-volatile memory 204 (idle state 304). Details of the transition between states 302, 310 and 304 are discussed below with respect to FIG. 4 (e.g., steps 402, 404, 406, 408, 410, 412, and 414).

Once information handling system 100 transitions from power up state 302 to idle state 304, information handling system 100 may continue to process data until a power loss is detected. In some embodiments, information handling system 100 may be properly shut down (e.g., automatically by information handling system 100 or manually by a user), allowing for all dirty data in volatile memory 202 to be flushed to storage device 114 and the system to enter power down state 314 without losing any data.

Once data is restored (e.g., PG=1) information handling system 100 may transition from power restore state 314 to power up state 302. In some embodiments, power may be restored to information handling system 100 manually by a user after a proper system shut down. Alternatively, power may be restored to information handling system 100 after a power failure or interruption.

In the event of a power failure or otherwise a power interruption (e.g., PG=0 indicating a power loss to component(s) of information handling system 100), information handling system may transition from idle state 304 to backup state 306, where dirty data in volatile memory 202 may be written to non-volatile memory 204. After the dirty data has been stored in non-volatile memory 204, information handling system 100 may transition from backup state 306 to power down state 314. Details of the restoration or back-up of dirty data are discussed below with respect to FIG. 5.

If power is restored (PG=1) to information handling system 100 during the backup of the dirty data at backup state 306, where information handling system 100 may transition from backup state 306 to glitch restore state 308. In glitch restore state 308, any dirty data in volatile memory 202 may be flushed to storage device 114. Details of the glitch restore state 308 are discussed below with respect to FIG. 6 (e.g., steps 602, 604, and 606).

After the dirty data has been flushed to storage device 114 at glitch restore state 308, NE=0 indicating non-volatile memory 204 needs to be initialized, and information handling system 100 may transition from glitch restore state 308 to erase state 310. At erase state 310, data (e.g., dirty or non-dirty data) stored in non-volatile memory 204 may be erased. Details of the transition between glitch restore state 308, erase state 310, and subsequently idle state 304 are discussed below with respect to FIG. 6.

Figure 4:
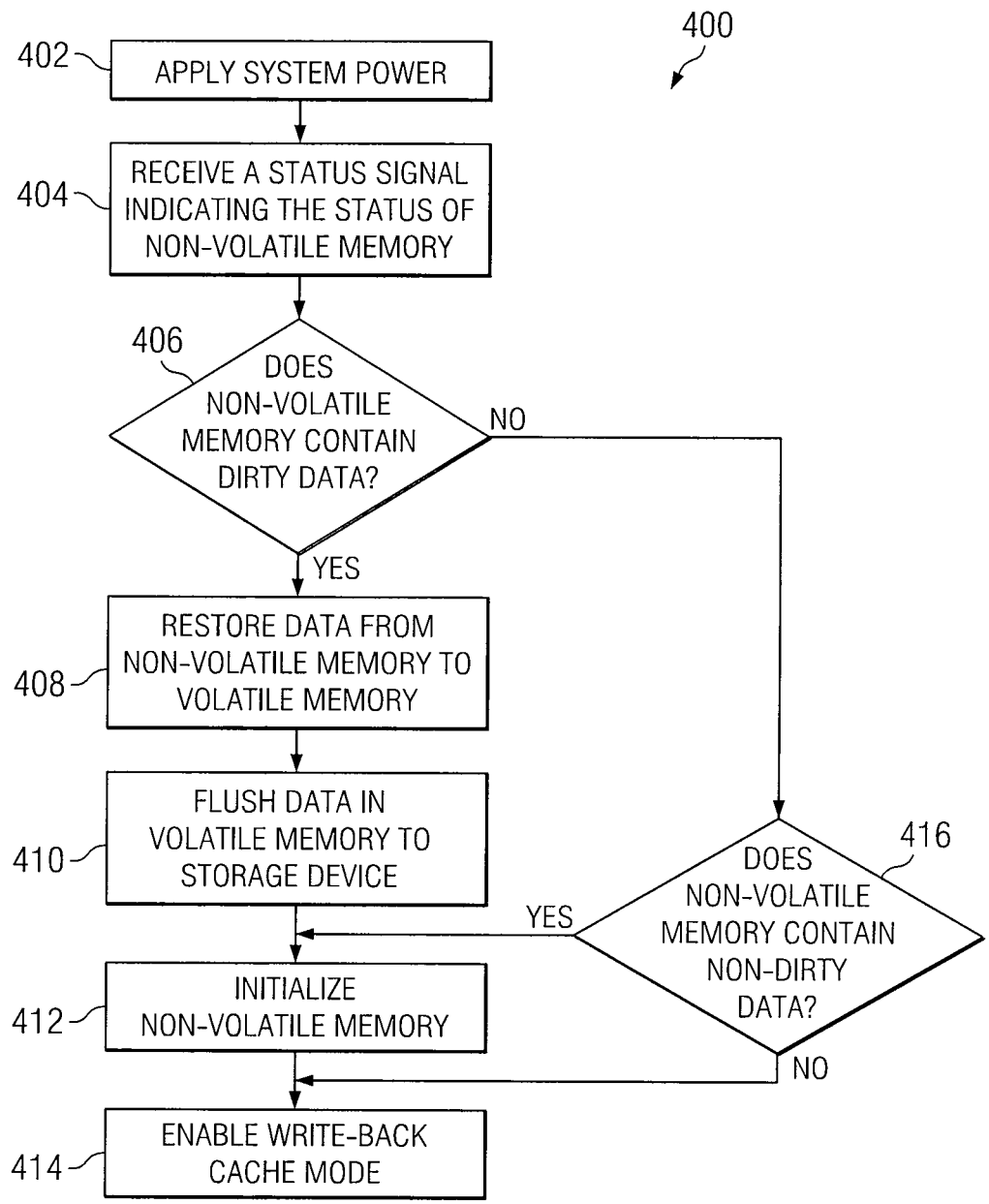
FIG. 4 illustrates an example flowchart of a method for controlling a cache in connection with a power up sequence of the cache, in accordance with certain embodiments of the present disclosure.

FIG. 4 illustrates an example flowchart of a method 400 for controlling a cache in connection with a power up sequence of the cache, in accordance with certain embodiments of the present disclosure. In one embodiment, a power up sequence may include bringing information handling system 100 back on-line (e.g., powered on) after a normal shutdown. In other embodiments, a power up sequence may include restoring power to information handling system 100, including restoring power to cache 110 after a power event (e.g., power failure, power glitch, power interruption, etc.).

At step 402, power from power supply unit 108A is supplied to information handling system 100 including cache 110.

At step 404, controller 112 may receive a status signal (e.g., cache_dirty signal) from cache 110 indicating the status of component(s) of cache 110 including, for example, non-volatile memory 204. In one embodiment, FPGA 206 may read a parameter from non-volatile memory 204 (e.g., a flash header) indicating whether or not non-volatile memory 204 is storing "dirty" data (e.g., valid data that has not yet been flushed to a storage device).

At step 406, controller 112 and/or another component of information handling system 100 may determine based at least on the received status signal whether non-volatile memory 204 includes dirty data. If non-volatile memory 204 does include dirty data, method 400 may proceed to step 408. Otherwise, if non-volatile memory 204 does not include dirty data, method 400 may proceed to step 416.

At step 408, controller 112 and/or cache 110 may restore the dirty data from non-volatile memory 204 to volatile memory 202. In one embodiment, cache 110 may send a signal to controller 112 indicating the restoration of data from non-volatile memory 204 to volatile memory 202. Controller 112 may hold off on accessing cache 110 during this step.

At step 410, controller 112 may receive a signal from cache 110 indicating that the restoration of data is complete. In response to the received signal, controller 112 may flush the restored dirty data to storage device(s) 114 (e.g., hard drives).

At step 412, controller 112 and/or FPGA 206 may initialize non-volatile memory 204. Generally, for non-volatile memory 204, any data (e.g., dirty or non-dirty data) currently being stored needs to be erased before another write occurs at non-volatile memory 204. Thus, in one embodiment, the initialization may include erasing dirty data and/or non-dirty data stored in non-volatile memory 204. Non-dirty data may refer to data that does not need to be stored in storage device 114.

At step 414, controller 112 may receive a signal from cache 110 indicating the status of component(s) of cache 110. In one embodiment, the signal may indicate that volatile memory 202 has been flushed and/or that non-volatile memory 204 has been initialized. In response to the received signal, controller 112 may enable cache 110 for write-backs.

At step 416, controller 112 and/or another component of information handling system 100 may determine if non-volatile memory 204 contains any data. In one embodiment, controller 112 and/or FPGA 206 may read a parameter from non-volatile memory 204 (e.g., a flash header) indicating whether or not non-volatile memory 204 is storing any data. If non-volatile memory 204 does include data, method 400 may proceed to step 412 described above. Otherwise, if non-volatile memory 204 does not include any data, method 400 may proceed to step 414 described above.

Figure 5:
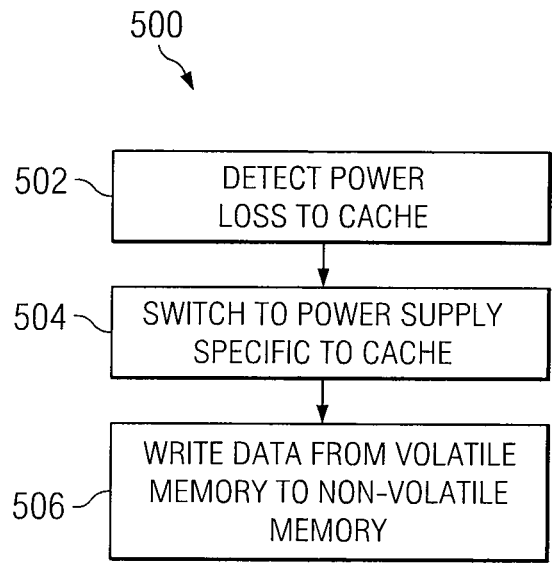
FIG. 5 illustrates an example flowchart of a method for controlling a cache upon detecting a power event, in accordance with certain embodiments of the present disclosure.

FIG. 5 illustrates an example flowchart of a method 500 for controlling cache 110 upon detecting a power event, in accordance with certain embodiments of the present disclosure. At step 502, FPGA 206 may detect a power event such as a power failure or a power interruption to either information handling system 100 and/or cache 110. In one embodiment, power supply unit 108A may have failed or may have interrupted, ceasing the power supply to various components of information handling system 100.

At step 504, FPGA 206 may switch to a power supply unit 108B coupled to cache 110. Power supply unit 108B may be a capacitor, a super capacitor, battery, or other suitable power supply that is operable during a power event such as a power failure or a power interruption.

At step 506, FPGA 206 may write the data stored in volatile memory 202 to non-volatile memory 204, which allows the data to be saved and subsequently be re-written to storage device(s) 114 upon the restoration of power to information handling system 100.

In some embodiments, cache 110 may hold one or more signals for controller 112 during and after the power event (e.g., for when power is later restored to various components of information handling system 100). For example, controller 112 may set or hold a signal for controller 112 indicating that non-volatile memory 204 includes dirty data. Upon restoration of power, controller 112 may receive the set or held signal from cache 110 indicating the presence of dirty data in non-volatile memory 204 (e.g., step 404 of FIG. 4).

Figure 6:
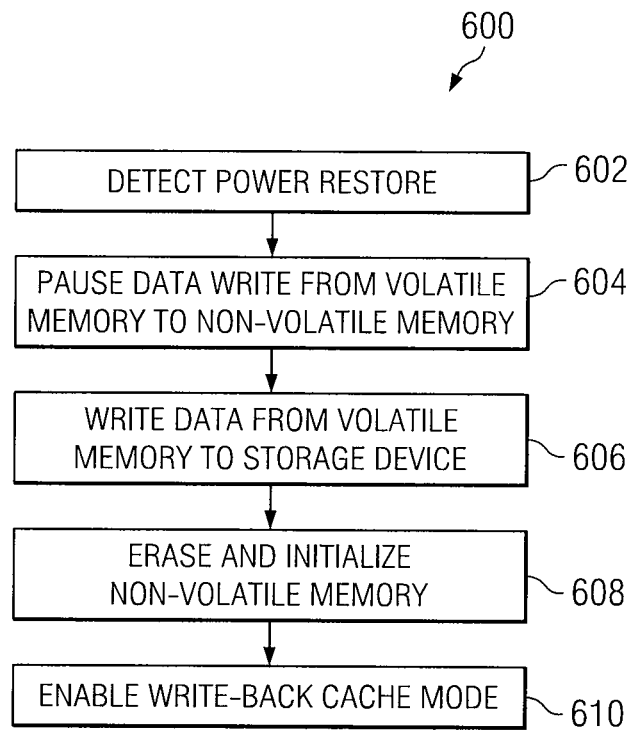
FIG. 6 illustrates an example flowchart of a method for controlling a cache in connection with another power event, in accordance with certain embodiments of the present disclosure.

FIG. 6 illustrates an example flowchart of another method 600 for controlling cache 110 in connection with power event, in accordance with certain embodiments of the present disclosure. In some embodiments, during the writing of data from volatile memory 202 to non-volatile memory 204 (e.g., step 506 of FIG. 5) and before the discharge or power failure of power supply unit 108B, power may be restored to various components of information handling system 100, including cache 110. The power supplied may be due to a complete restoration of power to information handling system 100 due to a glitch, the start-up of backup generators, or other recoveries from temporary power interruptions, for example.

At step 602, controller 112 and/or FPGA 206 may detect a power restore to various components of information handling system 100 during the process of writing data from volatile memory 202 to non-volatile memory 204 (e.g., step 506 of FIG. 5).

At step 604, controller 112 may receive a signal from cache 110 indicating that the volatile memory 202 includes dirty data. Controller 112 and/or FPGA 206 may pause the process of writing data from volatile memory 202 to non-volatile memory 204 (e.g., step 506 of FIG. 5).

At step 606, the data stored in volatile memory 202 may be flushed to storage device(s) 114, and controller 112 may enter a write-through cache mode.

At step 608, controller 112 and/or FPGA 206 may erase any data stored (e.g., data transferred during step 508 of FIG. 5 and/or other stored data) in non-volatile memory and subsequently initialize non-volatile memory 204 to receive and store data. After the initialization of non-volatile memory 204, cache 110 may send a signal to controller 112 indicating non-volatile memory 202 is initialized.

At step 610, in response to the received signal from step 608, controller 112 may enable a write-back cache mode.

The present disclosure provides, for example, various algorithms for controlling data transfers of cache 100 and/or storage device(s) 114 for different power events of information handling system 100. The simple and robust algorithms provide data integrity as well as improved data transfer management.

Although the present disclosure has been described in detail, it should be understood that various changes, substitutions, and alterations can be made hereto without departing from the spirit and the scope of the invention as defined by the appended claims.

What is claimed is:

1. A method for controlling a cache having a volatile memory and a non-volatile memory during a power up sequence, the method comprising:

in response to receiving sufficient power, transitioning an information handling system (IHS) from a power down state to a power up state;

receiving, at a field programmable gate array (FPGA) configured to control the cache, a flag communicated from the non-volatile memory indicating that the non-volatile memory includes dirty data copied previously from the volatile memory to the non-volatile memory during a previous power down sequence, the dirty data comprising data that has not been stored in a storage device;

transitioning the IHS from the power up state to a restore state; and in response to the received flag:

the FPGA restoring the dirty data from the non-volatile memory to the volatile memory;

the FPGA communicating a first signal to a controller associated with the cache and in response to the first signal, the controller flushing the restored dirty data from the volatile memory to the storage device; and after flushing the restored dirty data from the volatile memory to the storage device, the FPGA:
  transitioning the IHS from a restore state to an erase state;
  erasing the restored dirty data from the non-volatile memory;
  initializing the non-volatile memory for subsequent writing;
  communicating a second signal to the controller indicating the non-volatile memory is initialized; and
  transitioning the cache to a write-back mode.

2. A method according to claim 1, further comprising in response to the flag:
  determining whether the non-volatile memory includes non-dirty data; and
  initializing the non-volatile memory in response to the determining step.

3. The method according to claim 2, wherein initializing the non-volatile memory comprises erasing data in the non-volatile memory.

4. The method according to claim 1, wherein the controller is a RAID controller.

5. The method according to claim 1, wherein the storage device is an integral part of a RAID.

6. The method according to claim 1, wherein the non-volatile memory comprises a flash memory.

7. A method for controlling a cache having a volatile memory and a non-volatile memory, the method comprising:
  detecting a power loss to the cache;
  in response to the power loss detection, transitioning an information handling system (IHS) from an idle state to a backup state;
  in response to the power loss detection, automatically enabling a backup power supply associated only with the cache;
  in response to the power loss detection, a field programmable gate array (FPGA) automatically writing dirty data from the volatile memory to the non-volatile memory, the dirty data comprising data that has not been stored in a storage device;
  after writing the dirty data, transitioning the IHS from the backup state to a power down state; and
  upon restoration of power to the cache, the FPGA receiving a signal communicated from the non-volatile memory and the FPGA communicating the signal to a controller associated with the cache, the signal indicating presence of the dirty data in the non-volatile memory.

8. The method according claim 7, further comprising:
  detecting the restoration of power to the cache prior to completing the writing step;
  pausing the writing step; and
  flushing the dirty data from the volatile memory to a storage device associated with the cache.

9. The method according to claim 8, further comprising initializing the non-volatile memory in response to the detecting step.

10. The method according to claim 9, wherein initializing the non-volatile memory comprises erasing non-dirty data in the non-volatile memory.

11. The method according to claim 7, wherein the controller is a RAID controller.

12. The method according to claim 7, wherein the storage device is an integral part of a RAID.

13. The method according to claim 7, wherein the non-volatile memory comprises a flash memory.

14. An information handling system (IHS), comprising:
  a processor;
  a cache coupled to the processor, comprising:
    a volatile memory; and
    a non-volatile memory;
  a storage device;
  a controller associated with the cache and the storage device; and
  a field programmable gate array (FPGA) coupled to the controller, the volatile memory, and the non-volatile memory, the FPGA configured to:
    receive a flag communicated from the non-volatile memory indicating whether the non-volatile memory includes dirty data, the dirty data comprising data that has not been stored in the storage device; and
    in response to the received flag:
      transition the IHS from a power up state to a restore state;
      restore the dirty data from the non-volatile memory to the volatile memory;
      communicate a first signal to the controller to flush the restored dirty data from the volatile memory to the storage device; and
      after detecting that the restored dirty data is flushed from the volatile memory to the storage device:
        transitioning the IHS from a restore state to an erase state;
        erasing the restored dirty data from the non-volatile memory;
        initialize the non-volatile memory for subsequent writing;
        communicate a second signal to the controller indicating the non-volatile memory is initialized; and
        transition the cache to a write-back mode.

15. The information handling system according to claim 14, wherein the storage device is an integral part of a RAID.

16. An information handling system (IHS), comprising:
  a processor;
  a cache coupled to the processor, comprising:
    a volatile memory; and
    a non-volatile memory;
  a power supply unit coupled to the cache and associated only with the cache;
  a storage device;
  a controller associated with the cache and the storage device;
  a field programmable gate array (FPGA) coupled to the controller, the volatile memory, and the non-volatile memory; and
  wherein the FPGA is configured to detect a power loss to the cache and in response to the power loss detection:
    transition the IHS from an idle state to a backup state;
    enable the power supply unit;
    write dirty data from the volatile memory to the non-volatile memory, the dirty data comprising data that has not been stored in the storage device;
    after writing the dirty data, transition the IHS from the backup state to a power down state; and
    upon restoration of power to the cache, receive a signal communicated from the non-volatile memory and communicate the signal to the controller indicating presence of the dirty data in the non-volatile memory.

17. The information according to claim 16, wherein the storage device is an integral part of a RAID.

18. The information according to claim 16, wherein the non-volatile memory comprises a flash memory.

\* \* \* \* \*